(12) United States Patent
Galland et al.

(10) Patent No.: US 7,270,750 B2
(45) Date of Patent: Sep. 18, 2007

(54) CLARIFIER RECYCLE SYSTEM DESIGN FOR USE IN WASTEWATER TREATMENT SYSTEM

(75) Inventors: Karel V. Galland, Vancouver (CA); Zdenek Sekerka, Jevicko (CZ); Frantisek Skacel, Brno (CZ)

(73) Assignee: Ecofluid Systems, Inc., Vancouver, B.C. (CA)

( * ) Notice: Subject to any disclaimer, the term of this patent is extended or adjusted under 35 U.S.C. 154(b) by 25 days.

(21) Appl. No.: 11/400,066

(22) Filed: Apr. 7, 2006

(65) Prior Publication Data

US 2006/0254966 A1 Nov. 16, 2006

Related U.S. Application Data

(60) Provisional application No. 60/669,656, filed on Apr. 8, 2005.

(51) Int. Cl.
  *C02F 3/00* (2006.01)
(52) U.S. Cl. .................... 210/220; 210/532.2
(58) Field of Classification Search ................ 210/220, 210/532.2
  See application file for complete search history.

(56) References Cited

U.S. PATENT DOCUMENTS

| | | | |
|---|---|---|---|
| 1,982,246 A | 11/1934 | Fischer |
| 2,230,386 A | 2/1941 | Pecker |
| 2,296,437 A | 9/1942 | Green |
| 2,348,124 A | 5/1944 | Green |
| 2,852,140 A | 9/1958 | MacLaren |
| 3,010,581 A | 11/1961 | Knapp et al. |
| 3,053,390 A | 9/1962 | Wood |
| 3,166,501 A | 1/1965 | Spohr |
| 3,195,727 A | 7/1965 | Kibbee |
| 3,202,285 A | 8/1965 | Williams |
| 3,355,023 A | 11/1967 | Foster |
| 3,393,804 A | 7/1968 | Miller et al. |
| 3,419,146 A | 12/1968 | Koulovatos |
| 3,841,998 A | 10/1974 | Farrell, Jr. |
| 3,959,144 A | 5/1976 | Mackrle et al. |
| 3,964,998 A | 6/1976 | Barnard |
| 3,994,802 A | 11/1976 | Casey et al. |
| 4,008,159 A | 2/1977 | Besik |
| 4,029,575 A | 6/1977 | Bykowski et al. |
| 4,054,524 A | 10/1977 | Mackrle et al. |
| 4,104,167 A | 8/1978 | Besik |
| 4,139,457 A | 2/1979 | Mackrle et al. |

(Continued)

FOREIGN PATENT DOCUMENTS

DE           3602736           8/1987

(Continued)

*Primary Examiner*—Chester T. Barry
(74) *Attorney, Agent, or Firm*—Taft, Stettinius & Hollister LLP

(57) ABSTRACT

A recycle system for use in a waste treatment facility utilizing either partially fluidized or combined fluidized bed filtration principles comprising the use of discrete passageways to allow flow between the bottom of the clarifier and the aeration compartment, a baffle positioned between bubblers in the aeration compartment and the clarifier openings, and a conduit positioned in the clarifier to provide flow between the clarifier and the anoxic compartment that helps prevent the formation of settled sludge pockets, allows for almost complete evacuation of the solids during "no flow" conditions, and improves on other inefficient conditions inherent in treatment systems using prior art recycle designs.

22 Claims, 5 Drawing Sheets

U.S. PATENT DOCUMENTS

| | | |
|---|---|---|
| 4,146,471 A | 3/1979 | Wyness |
| 4,341,630 A | 7/1982 | Mackrle et al. |
| 4,390,422 A | 6/1983 | Mackrle et al. |
| 4,430,215 A | 2/1984 | Mackrle et al. |
| 4,585,556 A | 4/1986 | Mackrle et al. |
| 4,650,585 A | 3/1987 | Hong et al. |
| 4,664,794 A | 5/1987 | Mackrle et al. |
| RE32,429 E | 6/1987 | Spector |
| 4,707,252 A | 11/1987 | Durot et al. |
| 4,919,815 A | 4/1990 | Copa et al. |
| 4,950,396 A | 8/1990 | Skaar et al. |
| 5,032,276 A | 7/1991 | Mackrle et al. |
| 5,393,427 A | 2/1995 | Barnard |
| 5,505,862 A | 4/1996 | Sonnenrein |
| 5,549,827 A | 8/1996 | Batson |
| 5,603,833 A | 2/1997 | Miller |
| 5,720,876 A | 2/1998 | Mackrle et al. |
| 5,733,456 A | 3/1998 | Okey et al. |
| 5,755,966 A | 5/1998 | Mackrle et al. |
| 5,766,459 A | 6/1998 | Adams, Jr. |
| 5,830,351 A | 11/1998 | Adams, Jr. |
| 5,951,860 A | 9/1999 | Guy |
| 6,092,671 A | 7/2000 | Ruehrwein et al. |
| 6,165,359 A | 12/2000 | Drewery |
| 6,171,498 B1 | 1/2001 | Fassbender et al. |
| 6,217,761 B1 | 4/2001 | Catanzaro et al. |
| 6,224,773 B1 | 5/2001 | Adams, Jr. |
| 6,352,643 B1 | 3/2002 | Kwon et al. |
| 6,398,957 B1 | 6/2002 | Mandt |
| 6,444,125 B2 | 9/2002 | Han |
| 6,620,322 B1 | 9/2003 | Vesio et al. |
| 7,087,175 B2 | 8/2006 | Mackrle et al. |

FOREIGN PATENT DOCUMENTS

| | | |
|---|---|---|
| EP | 0087129 | 2/1983 |
| WO | WO-9834880 | 8/1998 |

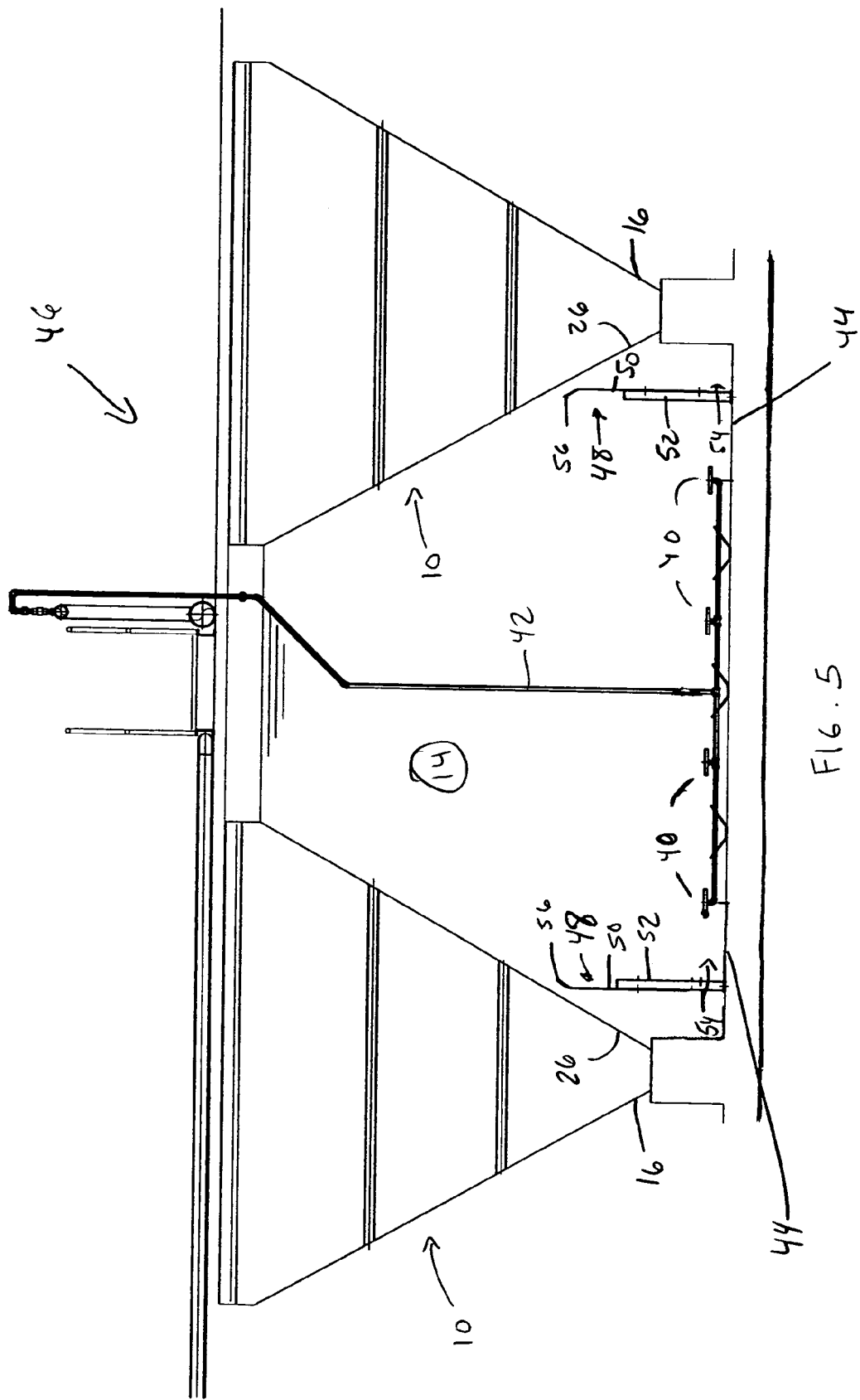

CLARIFIER RECYCLE SYSTEM DESIGN FOR USE IN WASTEWATER TREATMENT SYSTEM

CROSS-REFERENCE TO RELATED APPLICATIONS

The present application claims the benefit of U.S. Provisional Patent Application Ser. No. 60/669,656 entitled "Improved Clarifier Recycle System Design for use in Wastewater Treatment System", filed Apr. 8, 2005, the disclosure of which is hereby incorporated by reference.

FIELD

The present invention relates to waste material management, and more particularly to a recycle system for use therein, for use in purifying a waste influent material in a biological waste treatment plant utilizing aeration and anoxic compartments and upflow sludge blanket filtration techniques.

BACKGROUND

For the purposes of biological treatment, compact biological reactors, which include anoxic (denitrification), aeration (nitrification) and sludge separation (clarifier) zones, and activated sludge recirculation system within one compact design are increasingly being used. Wastewater is treated by biological process using activated sludge, a mixture of microorganism, which requires ingredients contained in the wastewater for its growth and survival. During the process, ammonia compounds are oxidized to nitrite/nitrates (nitrification) and subsequently nitrite/nitrates are reduced to nitrogen gas (denitrification). In the separation zone, activated sludge is separated from the treated effluent by fluidized bed type filtration system and the separated activated sludge is recycled by means of airlift or mechanical pumps back to the anoxic zone.

The use of fluidized bed filtration-type processes for water treatment in such systems is also well known. Such processes generally rely on a decreasing upward velocity gradient that is formed by water flowing upwardly in a separator (or clarifier) through a fluidized bed created by agglomerated solids that are flowing downwardly to the bottom of the separator. Processes using this general concept are fully shown in described in U.S. Pat. Nos. 6,620,322, 5,755,966 and 5,720,876 and U.S. application, Publication No. US 2005/0000907 A1, the contents of which are herein incorporated by reference. The technical applications of such processes involve a wide range of chemical treatment of underground and surface water for communal and industrial use, and prevailing portion of municipal, industrial and agricultural biological wastewater treatment. Processes such as these rely on the flocculation of solids and a decreasing upward velocity profile through a "sludge blanket" formed by the flocculated solids. This sludge blanket, acting much like a fluidized bed, is responsible for the filtering of the generally upwardly flowing fluid. In order to get the desired decreasing upward velocity gradient, the separating space is usually formed with upwardly broadening diffuser shape cross sections. Common shapes that are used for this purpose include a simple inverted truncated cone, a longitudinal prism, a toroidal prism (which can also be described as an inverted truncated cone with inserted central cone or cylinder), among others.

The fluidized bed that is formed in the aforementioned process, generally called a sludge blanket, consists of a fluidized layer of flocculated solid waste particles. Inside the sludge blanket there is preferably formed a dynamic equilibrium: on one side the flocculation of smaller flocs leads to the creation of larger flocs and on the other side the larger flocs are disintegrated by hydrodynamic forces resulting from local turbulence thereto. The result of those two counteracting processes is a certain, generally uniform mean floc diameter and floc size distribution in a given place. In this manner, a fluidized bed like blanket may be formed having particles of generally standard size and shape.

Needless to say, in order to maintain dynamic equilibrium in a system utilizing a clarifier such as the one discussed above, there must be removal of suspended solids from the sludge blanket proportionally corresponding to the solids in the liquid flowing into the clarifier section. It is this removal that generally distinguishes the type of filtering that is being utilized. More specifically, in a fully fluidized bed system, the solids are generally withdrawn from the top of the sludge blanket. In a combined fluidized bed system, the solids are generally withdrawn from the middle of the sludge blanket. And in a partially fluidized bed system, the solids are generally withdrawn from the bottom of the sludge blanket. As will be discussed in detail below, the improved clarifier disclosed and claimed herein is generally useful in the partially or combined fluidized bed type systems.

In a partially fluidized bed system, the density current flows along the walls of the clarifier allowing the excess flocs to be removed at bottom of sludge blanket. Early on, this was accomplished using a simple return of separated suspended solids through the input. Later on, it was determined that increased performance could be obtained by forced withdrawal of the separated solids from below the propagated density currents. Because the concentration of flocs in density currents is higher than what is required for a full fluidization, the partially fluidized sludge blanket is particularly suitable for separation of concentrated suspensions such as may be found in various typical biological wastewater applications. An example of a clarifier using this method is disclosed and discussed in aforementioned U.S. Pat. No. 6,620,322.

Also advantageous is what may be described as a "combined" fluidized bed sludge blanket. In a combined sludge blanket system the bottom part of the sludge blanket behaves similar to a fully fluidized bed while the upper part behaves more like a partially fluidized bed. The fully fluidized bottom part distributes the water and solids into the upper partially fluidized part and the excess flocs are withdrawn from the density currents at the walls of the clarifier from the side at the middle part of the sludge blanket. Due to the fact that withdrawn density currents do not flow against liquid flow in the region of high apparent velocity, the hydraulic load can be substantially higher than in a pure partially fluidized sludge blanket system. As noted above, the partially fluidized and combined sludge blankets are particularly well suited to biological wastewater treatment facilities. As is well known, biological processes generally include systems for aerobic activation, aerobic sludge stabilization, nitrification, denitrificaton, dephosphorization and selector action.

In order to meet the requirements for effective activation process, the sludge blanket needs a significant concentration of activated sludge, generally obtainable only by sludge recirculation. More specifically, using an internal circulation loop, mixed liquor suspended solids (sludge) enter the clarifier from the aeration compartment at the bottom and are filtered out of the effluent by the filter media consisting of flocculated suspended solids themselves. The effectiveness of this process is critical to filtration efficiency. In fact, given that the portion of sludge that is "activated" represents only a small percentage of the total sludge in the sludge blanket, and given that the efficiency of the system depends on the effective activation of the sludge, the overall efficiency of the waste treatment system is very much dependent on the efficient recirculation and activation of the sludge at or near the bottom of the sludge blanket (in a partial fluidized bed system) or closer to the middle (in a combined fluidized bed system).

In order to insure most efficient activation of the sludge, great care must be taken to ensure that the sludge is removed from the bottom of the clarifier evenly across the length of the clarifier and that no 'pockets' of settled sludge are formed. This is because such pockets may lead to partial plugging and an uneven withdrawal of sludge from the clarifier, and these may cause anoxic conditions within the pocket, nitrogen gas generation due to denitrification and pockets of non-activated sludge rising to the surface of the clarifier, all of which detrimentally effect the overall efficiency of the treatment system. In doing this, care must also be taken to make sure that bubbles of oxygen from the aeration diffusers located in the oxidation zone are not accidentally introduced into the clarifier. In summary, it has been found that overall treatment efficiency can be detrimentally effected by recycle systems which do not allow for complete evacuation of the solids during "no flow" conditions.

Accordingly, it is desired to have a recycle system for use in a clarifier in a sludge blanket filtration system utilizing either partially fluidized or combined fluidized conditions that improves on prior designs with respect to the removal and recirculation of suspended solids, helps prevent the formation of settled sludge pockets, allows for almost complete evacuation of the solids during "no flow" conditions, and improves on other inefficient conditions inherent in treatment systems using prior art recycle designs.

SUMMARY

What is provided is an improved clarifier recycle system for use in a wastewater treatment system that utilizes fluidized bed-type filtration and a method for using the same. More specifically, what is provided is an improved recycle system comprising a number of distinct passageways in the clarifier which allow for the flow of mixed liquor between the clarifier and the aeration compartment. Preferably the passageways are located proximate the bottom of the clarifier. Also provided in one preferred embodiment of the invention is the use of a baffle that may be placed in front of the discrete passageways to prevent oxygen/air from the aeration bubblers from entering the clarifier but which still allows for flow of solids and liquids underneath the baffle thereby not detrimentally effecting flow conditions. The use of such a baffle is not only advantageous in that it prevents oxygen/air bubbles from entering the clarifier, but that it allows the bubblers to be placed much closer to the clarifier than otherwise would be possible thereby making the oxidation chamber that much more efficient while helping to prevent undesirable anoxic sludge "pockets."

Also provided is a tube, pipe or conduit, having a number of distinct openings for the collection and recycling of sludge to the anoxic compartment. Preferably, the tube or pipe is located proximate the bottom of the clarifier (in a partial fluidized bed arrangement) or the middle of the clarifier (in a combined fluidized bed arrangement) and that the openings are located on a portion of the tube, pipe or conduit located opposite, and preferably staggered from, the passageways for mixed liquor flow between the clarifier and the aeration compartment.

As will be discussed in detail below, this arrangement of the recycling components of the sludge and mixed liquor from the clarifier provides greater filtration efficiency by helping to eliminate sludge "pockets" that lead to inefficient anoxic conditions within the pocket, nitrogen gas generation due to denitrification and pockets of sludge rising to the surface of the clarifier and allows for essentially complete evacuation of the solids during "no flow" conditions.

BRIEF DESCRIPTION OF THE DRAWINGS

FIG. 5 is a side elevation view of a portion of a waste treatment system in accordance with the present invention;

DETAILED DESCRIPTION

Figure 1:
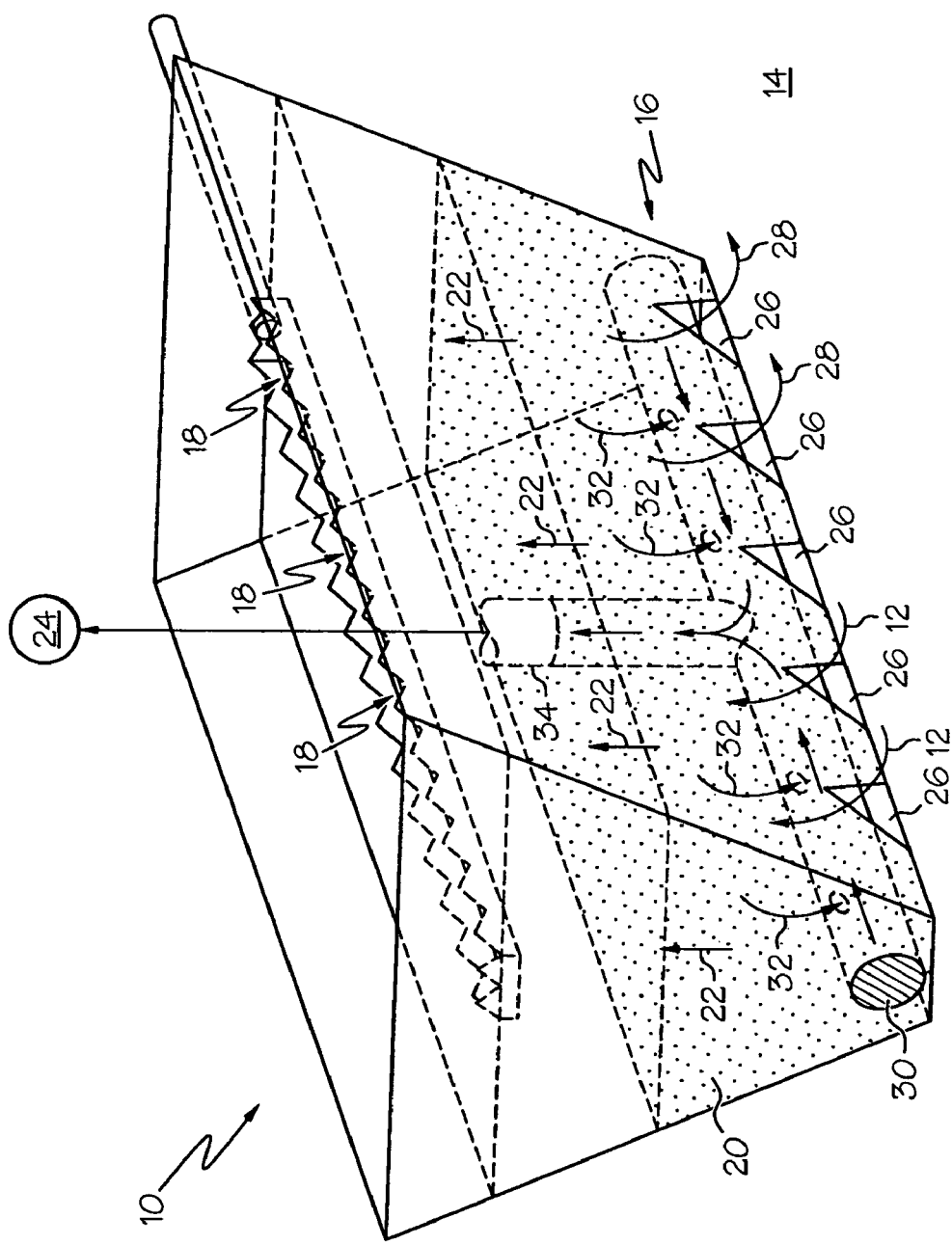
FIG. 1 is a front perspective view of an embodiment of a clarifier for use in connection with a waste treatment system in accordance with the present invention.
Figure 2:
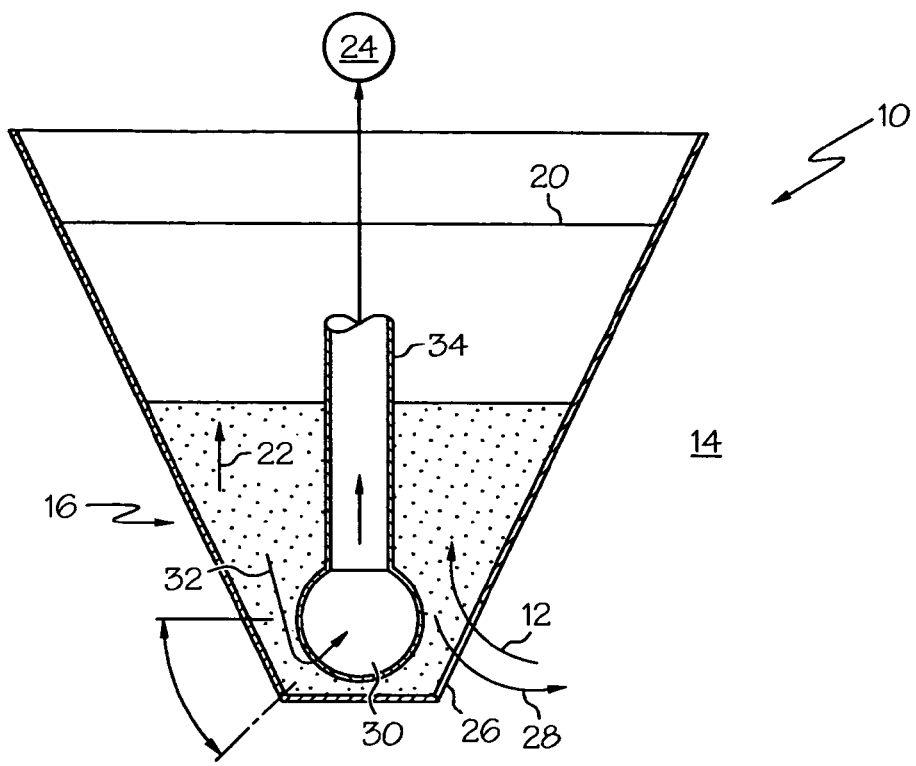
FIG. 2 is a side elevational view of the clarifier of FIG. 1.

What follows is a detailed description of an exemplary embodiment of the present invention. This description or the drawings associated therewith should not be construed as constituting a limitation of the invention. In particular, it is particularly noted that a combined sludge blanket system is not shown in the drawings but would still be considered within the scope of the present invention.

A clarifier 10 for use in connection with a fluidized bed-type filtration process is provided. Mixed liquor suspended solids 12 (sludge) enters the clarifier 10 from the aeration compartment 14 at the bottom 16 of the clarifier 10 and are filtered out of the effluent 18 by the filter media 20 consisting of flocculated suspended solids themselves. Driven by the stream vertical velocity uplift force 22, the suspended solids 20 grow by agglomeration on compact with other suspended solids or flocs of suspended solids. When the flocculated solids 20 become heavier than the vertical velocity uplift force 22, which progressively decreases due to the clarifier gradually increasing cross-section, they descend to the bottom 16 of the clarifier 10 and are subsequently recycled to the anoxic compartment 24 of the reactor.

In order to insure that the sludge 12 is removed from the bottom of the clarifier 10 evenly across the length of the clarifier 10 and that no 'pockets' of settled sludge are formed, a number of discrete passageways 26 alongside the bottom 16 of the clarifier 10 maybe formed, through which mixed liquor enters 12 or is allowed to exit 28 the clarifier 10. A tube, pipe or conduit 30, located near the bottom 16 of the clarifier 10 is also provided. The tube 30 includes openings 32 to allow for the collection of sludge 12 for recycling to the anoxic compartment 24. A pipe 34 may be connected to the tube 30 and is preferably operatively attached to a pump (not shown) for recycling the sludge 12 to the anoxic compartment 14.

When in use, there are essentially two modes of the clarifier 10 operation; incoming sewage mode and no incoming sewage ("no flow") mode. When sewage is added to the anoxic compartment 24 in the first mode, it is mixed with mixed liquor 12 recycled from the bottom 16 of the clarifier 10, utilizing the equipment described above. The mixed liquor (sludge) 12 then flows by gravity to aeration compartment 14 and enters the clarifier 10 through the passageways 26. Vertical velocity of the rising suspended solids 22 forming the sludge blanket 20 gradually slows down due to the prism or conical shape of the clarifier 10 and due to weight gain of the flocculating solids 20. This eventually causes the solids 20 to descend via gravity to the bottom 16 of the clarifier 10. From the bottom of the clarifier 10 the solids 20 enter the tube 30 via the openings 32 and are recycled, via the pipe 34 to the anoxic compartment 24.

When no sewage is added in the second mode, vertical velocity and the solids uplift force 22 drop to zero and all solids of the sludge blanket 20 start descending to the bottom 16 of the clarifier 10. It is in this mode that the possibility of the settled sludge pockets formation is the most acute. The function of the passageways 26 in this mode is to allow the settling solids 20 to exit 28 the bottom 16 of the clarifier 10 into the aeration compartment 14. Once the excess solids 20 are evacuated from the bottom 16 of the clarifier 10, flow of mixed liquor 12 into the clarifier 10 through passageways 26 driven by activated sludge recycle may be resumed. Thus within relatively short time intervals, the direction, the velocity and the orientation of the flow of mixed liquor within the bottom of the clarifier dramatically changes or reverses itself. The result is a continuous and complete evacuation ("clean-out") of the bottom of the clarifer, and elimination of the sludge settling and all its negative effects on the biological plant performance and operation.

Figure 3:
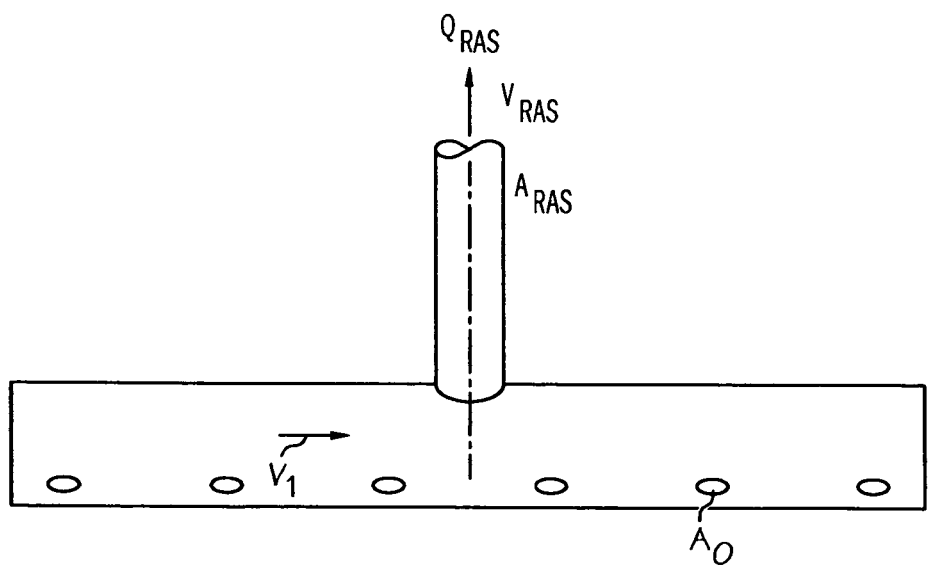
FIG. 3 is a rear view of the recycle pipe in the clarifier of FIG. 1.
Figure 4:
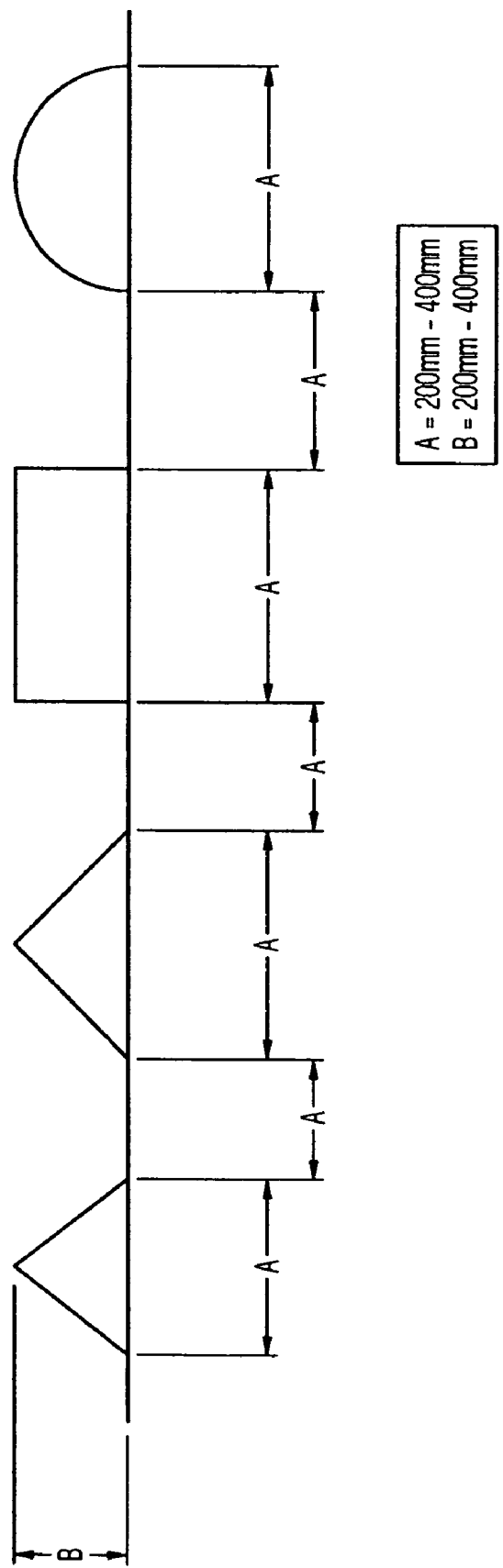
FIG. 4 is a depiction of passageways having various geometries useful in the clarifier of FIG. 1.

The openings 32 may be of any suitable shape or size and are preferably positioned on a side of the tube 30 opposite the passageways 26 in such a way that the centerlines of the passageways 26 are staggered from the centerlines of the openings 32. Referring to FIG. 3, the size of the openings may preferably be determined using the following equation:

$$Q_{RAS} = Q_{DES} \times RRR$$

$$A_{RAS} = \Sigma A_O$$

$$v_1 = 0.3 - 1.5 \text{ m/s}$$

$$v_{RAS} = 0.3 - 1.5 \text{ m/s}$$

$$RRR = 2 - 6$$

Where $Q_{RAS}$ Return Activated Sludge flow
$Q_{DES}$ Plant design average or maximum daily flow
RRR Return Activated Sludge flow recycle rate
$A_{RAS}$ Return Activated Sludge pipe area
$A_O$ Discreet openings area
v Flow velocity The passageways 26 may be of any suitable shape or size, but are preferably shaped and sized such that even transfer and withdrawal of recycled sludge is accomplished. As shown best in FIG. 4, examples of specific shapes of the passageways include triangular, rectangular, square or semicylindrical and may be sized as is appropriate given specific flow and wastewater treatment conditions.

Figure 7:
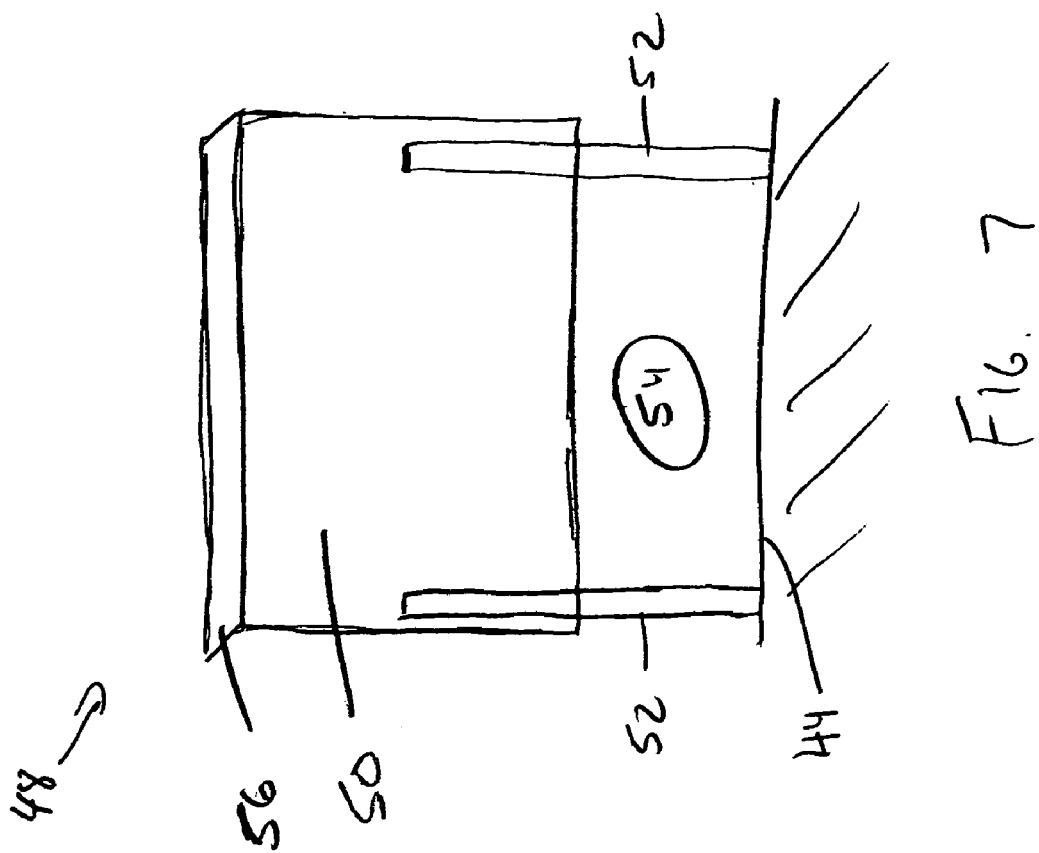
FIG. 7 is a front elevation view of the baffle of FIG. 6.
Figure 6:
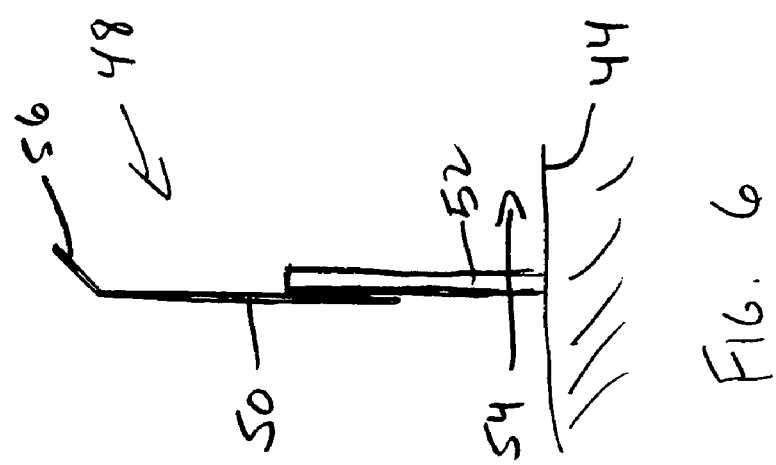
FIG. 6 is a side elevation detail view of a baffle as shown in FIG. 5.

In an exemplary embodiment, as best shown in FIGS. 5-7, the aeration compartment 14 is provided with bubblers 40 for bubbling air and/or oxygen into the aeration compartment 14 that are fed via a gas-line 42. The bubblers 40 are preferably positioned on the floor 44 of the waste treatment system 46 and are positioned in a manner to insure efficient distribution of the air/oxygen throughout the aeration compartment 14 as is generally known in the art in a manner to prevent the introduction of the air/oxygen gas directly into the clarifier 10. In an exemplary embodiment, this may be accomplished using a baffle 48 positioned between the bubblers 40 and the clarifier 10. The use of a baffle 48 allows the bubblers 40 to be placed closer to the clarifier 10 which can improve the efficiency of the aeration compartment 14 and help prevent the formation of the aforementioned anoxic sludge pockets.

Preferably the baffle 48 includes a main body member 50 and supports 52 and the main body member 50 is spaced from the floor 44 providing an opening 54 therebetween to allow for circulation and flow of solids and liquids through and around the aeration compartment 14. In particular, opening 54 helps to prevent the formation of anoxic sludge "pockets" and aids in the circulation of sludge throughout the entire aeration compartment thereby contributing to the overall efficiency of the system 46. Preferably the opening 54 is positioned in a manner such that gas from the bubblers 40 is prevented from entering the clarifier 10. Additionally, depending on the geometry of the clarifier 10 and the size and the placement of the bubblers 40, the main body member 50 may include an extension 56 on a top portion thereof to prevent gas from the bubblers 40 from entering the clarifier 10. In an embodiment of the invention, the extension 56 may be slanted to match the angle of the clarifier 10 wall.

As discussed herein the aeration compartment 14 immediately adjacent to the clarifier 10 passageways 26, the passageways 26, and the withdrawal pipe 34 are designed to facilitate entrained air separation and to accommodate the various flow streams as functions of the influent flow. Activated sludge flow may at times be into the clarifier 10 or out of the clarifier 10 but it will often be simultaneous in and out flow depending on the influent flow rate and the clarifier bottom to the aeration sludge densities difference. Since the flow out of the clarifier 10 is as mentioned densities difference driven with no other energy input, the sludge flocs are not physically damaged (broken) which improves their settling characteristics and results in much improved flows at the bottom part of the clarifier 10.

The specific embodiments and examples set forth above are provided for illustrative purposes only and are not intended to limit the scope of the following claims. Additional embodiments of the invention and advantages provided thereby will be apparent to one of ordinary skill in the art and are within the scope of the claims.

What is claimed is:

1. An apparatus for use in connection with a waste treatment facility comprising:
    an anoxic compartment;
    an aeration compartment;
    a clarifier;
    a conduit positioned in said clarifier, said conduit being in fluid communication with said anoxic compartment, said conduit further including a plurality of openings positioned therein for allowing flow between said clarifier and said anoxic compartment; and
    a plurality of discrete passageways positioned in said clarifier for allowing flow between said aeration compartment and said clarifier.

2. The apparatus of claim 1 wherein said plurality of discrete passageways are located proximate a bottom of said clarifier.

3. The apparatus of claim 1 wherein said conduit is located proximate a bottom of said clarifier.

4. The apparatus of claim 1 wherein said conduit is located proximate a middle of said clarifier.

5. The apparatus of claim 1 wherein said discrete passageways are triangular, rectangular, square or semi-cylindrical in shape.

6. The apparatus of claim 1 wherein said conduit is an upside down "T"-shaped conduit.

7. The apparatus of claim 1 wherein said conduit is positioned across the length of said clarifier and said openings in said conduit are positioned on the opposite side of said conduit from said discrete passageways.

8. The apparatus of claim 7 wherein said openings are staggered with respect to said discrete passageways.

9. The apparatus of claim 1 wherein said clarifier has a vertical cross section that increases gradually from the bottom of the clarifier to the top of the clarifier.

10. The apparatus of claim 1 wherein said clarifier is in the shape of an upside down longitudinal prism.

11. The apparatus of claim 10 wherein said discrete passageways are formed substantially along the entire length of said clarifier.

12. The apparatus of claim 1 further comprising bubblers placed in said aeration compartment and a baffle placed between said bubblers and said clarifier.

13. The apparatus of claim 12 wherein said baffle includes an opening on a lower portion thereof to allow flow of sludge therethrough.

14. An apparatus for use in connection with a waste treatment facility comprising:
   an anoxic compartment;
   an aeration compartment;
   a clarifier having a vertical cross section that increases gradually from the bottom of the clarifier to the top of the clarifier;
   a conduit positioned in said clarifier, said conduit being in fluid communication with said anoxic compartment, said conduit further including a plurality of openings positioned therein for allowing flow between said clarifier and said anoxic compartment; and
   a plurality of discrete passageways positioned proximate a bottom of said clarifier for allowing flow between said aeration compartment and said clarifier.

15. The apparatus of claim 14 wherein said conduit is located proximate a bottom of said clarifier.

16. The apparatus of claim 14 wherein said conduit is located proximate a middle of said clarifier.

17. The apparatus of claim 14 wherein said discrete passageways are triangular, rectangular, square or semi-cylindrical in shape.

18. The apparatus of claim 14 further comprising bubblers placed in said aeration compartment and a baffle placed between said bubblers and said clarifier.

19. The apparatus of claim 18 wherein said baffle includes an opening on a lower portion thereof to allow flow of sludge therethrough.

20. The apparatus of claim 14 wherein said conduit is positioned across the length of said clarifier and said openings in said conduit are positioned on the opposite side of said conduit from said discrete passageways.

21. The apparatus of claim 20 wherein said openings are staggered with respect to said discrete passageways.

22. An apparatus for use in connection with a waste treatment facility comprising:
   an anoxic compartment;
   an aeration compartment having bubblers therein;
   a clarifier in the shape of an upside down longitudinal prism including a plurality of discrete passageways positioned proximate a bottom thereof for allowing flow between said aeration compartment and said clarifier;
   a conduit positioned in said clarifier, said conduit being in fluid communication with said anoxic compartment, said conduit further including a plurality of openings positioned on the arms thereof for allowing flow between said clarifier and said anoxic compartment, said openings being positioned on the opposite side of said conduit from said discrete passageways;
   a baffle positioned between said bubblers and said discrete passageways, said baffle having an opening in a bottom portion thereof to allow sludge circulation therethrough.

* * * * *